(No Model.)
O. ZWIETUSCH.
APPARATUS FOR RECOVERING WASTE GASES IN BREWERIES.
No. 585,900.
Patented July 6, 1897.
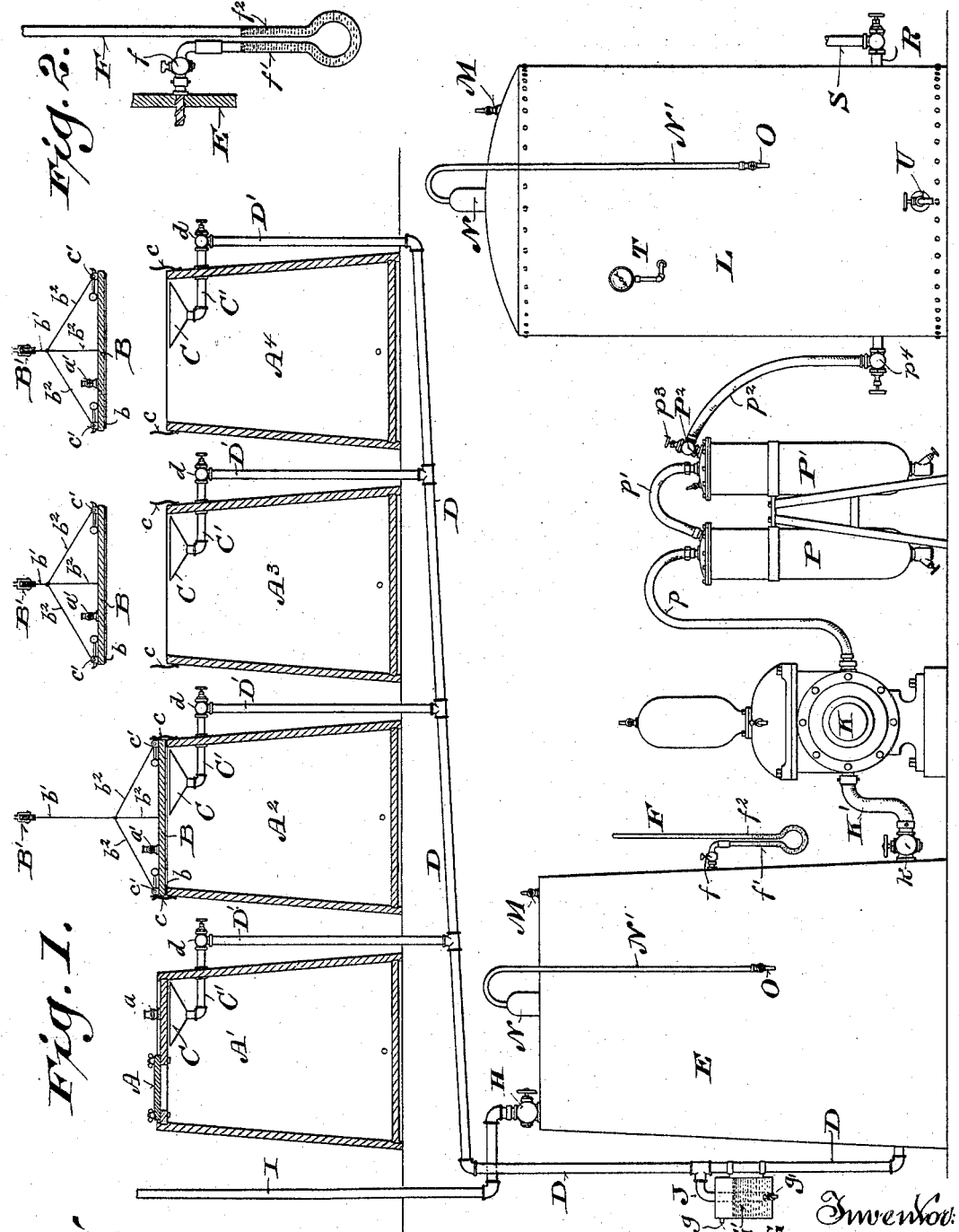

UNITED STATES PATENT OFFICE.

OTTO ZWIETUSCH, OF MILWAUKEE, WISCONSIN.

APPARATUS FOR RECOVERING WASTE GASES IN BREWERIES.

SPECIFICATION forming part of Letters Patent No. 585,900, dated July 6, 1897.

Application filed February 3, 1896. Serial No. 577,910. (No model.)

*To all whom it may concern:*

Be it known that I, OTTO ZWIETUSCH, a citizen of the United States, and a resident of Milwaukee, in the county of Milwaukee and State of Wisconsin, have invented certain new and useful Improvements in Apparatus for the Recovery of Waste Gaseous Products in Breweries; and I do hereby declare that the following is a full, clear, and exact description thereof.

My invention relates to the recovery and collection of carbonic-acid gas in breweries arising from the main fermentation in the fermenting-vats, and is in part an improvement on the invention patented to me on the 17th day of April, 1894, under Letters Patent No. 518,361; and it consists in certain new and useful apparatus therefor, all as will be fully set forth hereinafter and subsequently claimed.

In the drawings, Figure 1 is a general view of my improved apparatus, the several parts thereof being arranged in proper relative positions for the carrying out of my present invention. Fig. 2 is a detail view, on an enlarged scale, of the low-pressure and vacuum indicator, forming a part of said apparatus.

Referring to the drawings, $A'$ $A^2$ $A^3$ $A^4$ represent fermenting-vats, of which the first, $A'$, is a closed vat and the others are closable vats. The vat $A'$ is provided with any desired number of air-cocks $a$ for the admission of air into the interior of the said vat and with a manhole secured by suitable cover or plate, as shown at A. The other vats, $A^2$ $A^3$ $A^4$, are each shown provided with movable covers B B B, having suitable rubber packings $b\ b$ on their under sides. These covers are suspended directly over the vats by means of cords or chains $b'\ b^2\ b^2\ b^2$, the main cords or chains $b'$ passing over sheaves or pulleys $B'$, so as to be readily operated, when desired, to either close or open the said vats, and when the covers are closed down upon the vats they are preferably secured thereto in any suitable manner, as by clamps $c\ c'$, thus rendering the vats air-tight.

C C C are the gas-collectors, located immediately below the tops or covers of the fermenting-vats and communicating by means of pipes $C'$, passing through the vats, and branch exterior pipes $D'$ with the main leading-pipe D, which enters the gas-collecting tank E, there being suitable valves $d$ at the junction of the said pipes $C'\ D'$.

The gas-collecting tank E should be of as large a capacity as possible and is preferably located on a plane below that of the fermenting-vats. From the top or upper portion of this tank a tall pipe I extends vertically upward, leading to the open air, extending to about the plane of the top of the fermenting-vats and being controlled by a cock or valve H, adjacent to the tank.

F is a low-pressure and vacuum indicator communicating with the tank E at about the vertical center thereof and provided with a valve $f$, adjacent to the tank. This indicator consists of a doubled glass pipe $f'\ f^2$, the part $f'$ being next the tank and the upper end of said part leading to the interior of the same, while the part $f^2$ extends vertically upward for a considerable distance above this point of connection with the tank and is open at its upper end. The lower part of the indicator is filled with a colored liquid, such as water.

G is a safety device attached to the main leading-pipe D at a point, preferably, about opposite the point of connection of the indicator F and tank E. This safety device comprises a reservoir $G'$, partly filled with water or other suitable liquid and having an open top, or, if preferred, an open escape-vent $g$, above the water-line, and a valve-controlled outlet-pipe $g'$ at or adjacent to its lower end to empty said reservoir when desired, and an inlet-pipe J, extending from (and communicating with) the main leading-pipe D within said reservoir to a point close to the bottom thereof. When the pressure of the gas produced in the fermenting-vats (and consequently the pressure in pipe D) exceeds a predetermined limit, the surplus pressure escapes through the device G, and this escape is regulated by the height of the liquid column in the reservoir $G'$ and overpressure in the tank E thereby prevented. A liquid column of, say, two feet in reservoir $G'$ will permit the escape of the surplus pressure above a pressure of one pound to the square inch, and so on in proportion.

K is a gas-compressor for pumping the gas from the collecting-tank E, through the purifiers P P', into the gas-reservoir L.

$K'$ is a pipe connecting the tank E with the compressor K and is provided with a suitable valve $k$.

$p$ is a pipe leading from the compressor to the purifier P.

$p'$ is a pipe connecting the purifiers P P', and $p^2$ is a pipe leading from an outlet P² of the purifier P' to the said gas-reservoir L. The outlet P² is provided with a valve $p^3$, and there is another valve $p^4$ at the point of junction of the pipe $p^2$ and reservoir L. Both the gas-reservoir L and gas-collecting tank E are provided with air-cocks M M, and each of these vessels is provided with a domed extension N in the top or upper part thereof, from the top of which there leads a communicating flexible pipe N', terminating in a try-cock O.

The gas-reservoir L is shown provided with a pressure-gage T, and with a valve-controlled outlet-pipe U at or adjacent to its lower end, and with a gas-outlet pipe R, which may connect with a pipe S to lead the gas to any point desired for immediate or future use.

The operation of my device will be apparent from the foregoing description of its construction, taken in connection with the accompanying drawings. As it is preferable to have a free admission of atmospheric air to the fermenting-vats in the first stages of fermentation, I usually employ vats like A² A³ A⁴, with movable covers B, but if a closed vat, like A', is used, there must be a sufficient number of the air-cocks $a$ to enable the requisite quantity of air to quickly and readily enter the said vat in the early stages of the fermentation. The closable vats are also more easily cleaned than the closed vats, but when necessary to clean the latter this can be done through the described manhole shown at A. It is self-evident that the valves $d\ d$, through which the gas passes from the fermenting-vats to the gas-collecting tank E, are only opened after ascertaining that a practically clear gas is produced from the contents of the vats and not the mixture of gas and air which results from the early stages of the fermentation, and to determine and regulate this the several described covers B B B of the closable vats are provided with air-cocks $a'\ a'\ a'$, which (like the air-cocks $a$ of the closed vat A') are left open, and when the described mixture of gas and air has escaped therethrough and become exhausted then all the air-cocks $a'\ a'\ a'$ are closed and the gas-valves $d\ d\ d$ are opened, and the gas from the said fermenting-vats is led through the pipes C', valves $d$, and branch leading-pipes D' to the main leading-pipe D and into the gas-collecting tank E.

As stated, both the tank E and reservoir L are provided with air-cocks M to permit the escape of atmospheric air as the gas enters these vessels, and with try-cocks O at the ends of the flexible pipes N', leading from the domed extensions N, which communicate through the tops of these vessels with the interiors thereof. These try-cocks O are made with very small openings through their plugs to ascertain whether or not the gas contains air, and if it does these cocks may be kept open to get rid of this mixture of gas and air from the upper parts of said vessels continuously during the operation.

The object and function of the described domed extension N is to collect the air which is mingled with the gas within the tank or which is originally free therein at this highest point, the air being lighter than the gas, and the object of the try-cock O, with its very minute opening therethrough, is to test the contents of this domed extension N from time to time, (the said minute passage in the try-cock being kept continuously open, as stated, for the escape of this air,) and as this test in practice is made by putting this try-cock into a vessel containing a chemical solution it is more convenient to have the tube N' flexible, the test thus made being absolutely accurate and positively determining the period when the tank is free from air.

Referring now to the low-pressure and vacuum indicator F, its use is as follows: If there is no pressure in the tank E, its absence will be indicated by the described colored liquid columns being on the same level in both parts or tubes $f'\ f^2$ of the said indicator. If the compressor K draws enough gas from the tank E to cause a vacuum within the latter, then the liquid will rise in the part or tube $f'$, which enters the said tank, while if the pressure of gas in said tank increases the liquid will rise in the outer part or tube $f^2$, and as said liquid is colored and the indicator F is transparent the facts in the case, whatever they may be, are instantly shown by the relative heights of the liquid columns in the parts or tubes $f'\ f^2$. If desired, there may be graduation-marks on the said parts or tubes, but when a colored liquid is employed this is not absolutely necessary. The upright pipe I, as shown in Fig. 1, is understood as extending about thirty feet higher than the level of the indicator F to the open air. Now to ascertain the amount of carbonic-acid gas in the tank E the cock H is left open, and as there is a continuous supply and withdrawal of carbonic-acid gas to and from the tank E when the said tank and the upright pipe I are entirely filled with carbonic-acid gas, the indicator F will show a variation in the levels of the two columns of colored liquid of about one-quarter of an inch. In this way the amount of gas being drawn off may be known and regulated accordingly, without having a high pressure in the gas-collecting tank, so long as cock H is open, allowing a continuous free passage for any overproduction. If cock H is closed and pressure of too high a degree should occur, the surplus is blown off from the main leading-pipe through the inlet-pipe J into the reservoir G' and passes through the water or other liquid in said reservoir into the open air.

It will be understood that the object and function of my low-pressure and vacuum indicator F is to enable the operator to always learn by inspection thereof the condition of the contents of the gas-collecting tank and whether there is a greater or less amount of gas therein to be drawn off, and hence regulate the valves of the pump so that same will operate faster or slower in accordance with the production of the gas. The tube $f^2$ of the indicator is open to the air at its top, like the upright pipe I, and the carbonic-acid gas is of so much greater gravity than the air that all changes in the amount of gas within the tank will be instantly noted in the indicator, so that if less gas is being produced than is being drawn off the column of gas in the pipe I will be lowered and have less pressure, therefore, on the liquid in the indicator F.

I have already referred to the upright tall pipe I and explained how this tall pipe acted as a safety-valve when the cock H is open to guard against the danger of too high a pressure of the gas upon the liquid undergoing fermentation, and it similarly acts whenever the compressor K is stopped, as at night, so that the operation of fermentation may proceed regularly and the surplus gas escape freely from the tank.

While I have shown the gas-reservoir L as essentially like the collecting-tank E in its general construction, I do not limit myself to any particular kind or style of receiver and may employ any suitable receptacle for the gas in place of the reservoir L shown (dependent on whether the gas is to be stored for future use or to be directly or very shortly utilized) without departing from the scope of my invention.

Having thus described my invention, what I claim as new, and desire to secure by Letters Patent, is—

1. In apparatus for the recovery of waste gas, the combination with a suitable closed tank or receptacle, of a domed communicating extension rising from the top thereof, a flexible pipe leading from said extension, and a testing or try cock at the free end of said pipe.

2. In apparatus for the recovery of waste gas, the combination with a suitable closed tank or receptacle, having an open-ended upright pipe extending from the top thereof, of a low-pressure and vacuum indicator, comprising a doubled glass pipe, one end of which is in communication with said tank or receptacle below the plane of the base of the said open-ended upright pipe, the other end extending considerably above this point and there open to the air, and with the doubled parts or tubes extending below this point and communicating with each other, the free open end of said indicator terminating on a plane below that of the base of the said first-named open-ended upright pipe.

3. In apparatus for the recovery of waste gas, the combination with a fermenting-vat or series of vats, each vat having an air-tight top or cover, of a suitable closed tank or receptacle located on a plane below that of said vat or vats provided with a gas-outlet pipe, a gas-supply pipe or pipes leading from said vat or vats to said tank or receptacle, a valve-controlled open-ended upright pipe extending from the upper part of said tank or receptacle to about the plane of the top of said fermenting vat or vats, and a low-pressure and vacuum indicator communicating with the interior of said tank or receptacle, below the plane of the base of the said open-ended upright pipe.

In testimony that I claim the foregoing I have hereunto set my hand, at Milwaukee, in the county of Milwaukee and State of Wisconsin, in the presence of two witnesses.

OTTO ZWIETUSCH.

Witnesses:
H. G. UNDERWOOD,
B. C. ROLOFF.